June 1, 1948.　　　N. F. FONER　　　2,442,404
SNOW BIKE
Filed Oct. 3, 1946
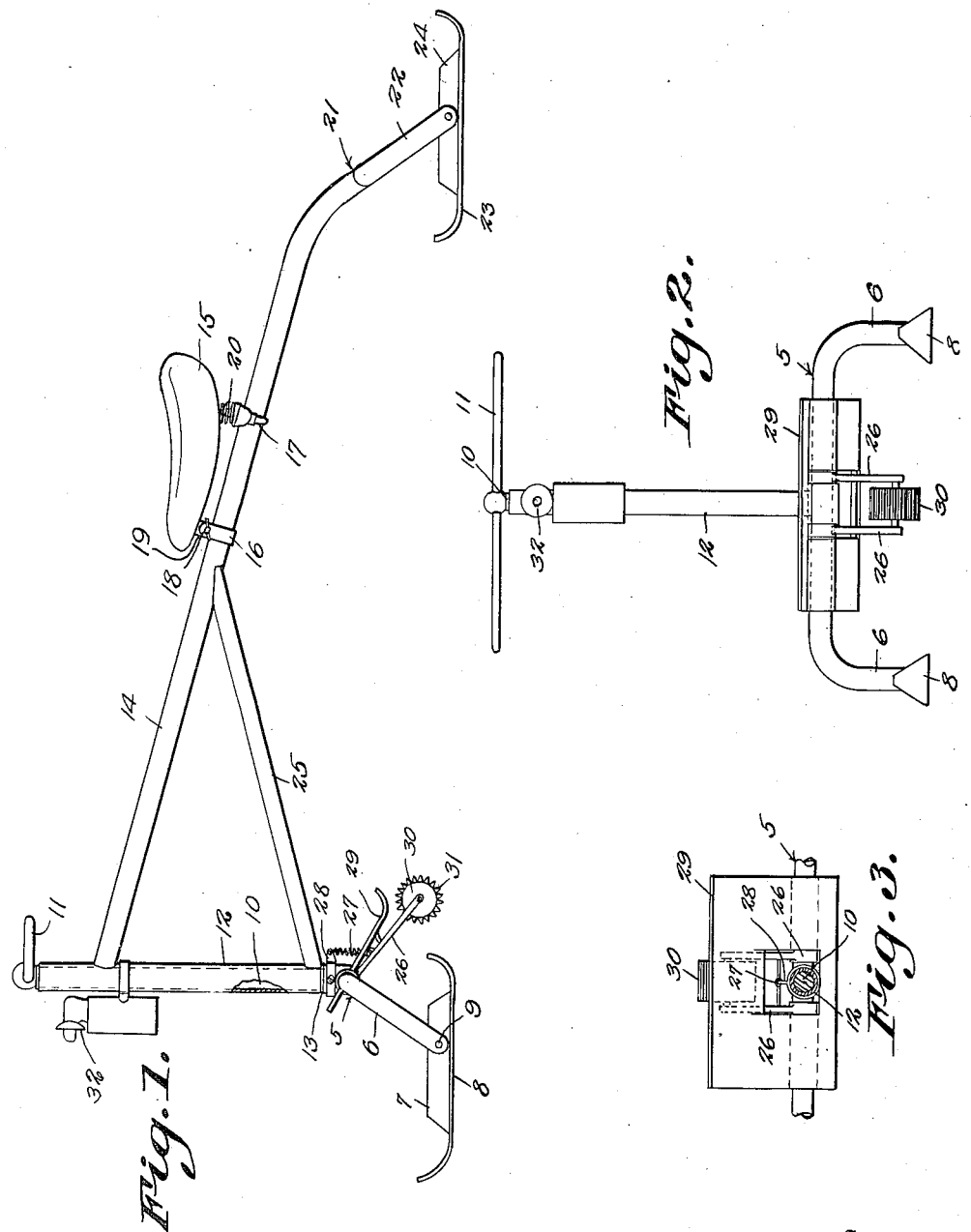
Inventor
Newton F. Foner
By C. A. Snow & Co.
Attorney Patented June 1, 1948

2,442,404

UNITED STATES PATENT OFFICE 2,442,404

SNOW BIKE

Newton F. Foner, Pittsburgh, Pa.

Application October 3, 1946, Serial No. 700,899

1 Claim. (Cl. 280—16)

This invention relates to snow vehicles or coasting devices, the primary object of the invention being to provide a vehicle of this character, including a runner supported frame, the frame being constructed so that the forward runners thereof may be adjusted or rotated to guide the vehicle.

Another object of the invention is to provide a snow vehicle having a seat to accommodate the rider, the seat being adjustable to adapt the device for use by persons of various sizes.

Another object of the invention is to provide a brake means, whereby the forward movement of the snow vehicle may be retarded at the will of the person riding the vehicle.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a side elevational view of a snow vehicle constructed in accordance with the invention.

Figure 2 is a front elevational view thereof.

Figure 3 is a horizontal sectional view through the steering post of the device, illustrating the brake pedal in plan.

Referring to the drawing in detail, the frame of the vehicle includes the front fork 5, which is inverted U-shape in formation, the arms 6 thereof being extended slightly forwardly, where they are pivotally connected to the upstanding flanges 7 of the runners 8, at 9. It will be understood that while pivotal movement between the runners and arms 6 is provided, this pivotal movement is only slight, to insure the complete control of the front runners at all times.

Disposed centrally of the front frame 5, and rising therefrom, is the steering post 10, on the upper end of which are secured the handle bars 11. The frame also includes a forward tubular member 12 that fits over the steering post 10, the lower end of the tubular member resting on the bearing 13 formed on the lower end of the steering post 10.

Secured to the tubular member 12 at a point adjacent to the upper end thereof, is the rearwardly extended main bar 14 of the frame, which constitutes the support for the seat 15, which is adjustably mounted on the main bar 14 by means of the split collar 16 and U-shaped clamp 17. A bolt 18 extends through the ear 19 extending from the seat 15, and through the split collar 16, the bolt 18 also passing through the split collar to secure the split collar in its positions of adjustment along the bar 14. A spring 20 is disposed between the seat and the U-shaped clamp to provide ease in riding. Secured at the rear end of the bar 14, is the rear fork 21, to the arms 22 of which are secured the runners 23, the arms 22 being pivotally connected to the upstanding flanges 24, as clearly shown by the drawing.

The reference character 25 indicates a brace bar that extends from the main bar 14, the front end thereof being secured to the lower end of the tubular member 12, at a point adjacent to the lower end thereof, thereby rigidly bracing the main bar against twisting. It will, of course, be understood that the bars or elements of the frame are preferably welded together to insure strength and durability.

Pivotally mounted on the horizontal bar of the front fork 5, is a brake arm 26, which is normally held in its inactive position by means of the coiled spring 27, which has its upper end secured to the arm 28, extending rearwardly from the horizontal bar of the front fork, the lower end being secured to the brake arm 26. Pivotally mounted above the brake arm is the brake pedal 29 that fits around the horizontal bar of the front fork 5, so that the instep portion of the foot may be positioned thereon.

Thus it will be seen that due to this construction, when the brake pedal is forced downwardly against the brake arm 26, the free end of the brake arm will be moved downwardly.

Mounted for rotary movement of the free end of the brake arm 26, is the brake wheel 30, which is formed with teeth 31 adapted to bite into the snow or icy surface over which the vehicle is moving, retarding the movement of the vehicle to brake its speed.

The braking operation can, of course, be regulated by varying the amount of pressure directed on the pedal and brake arm 26.

When the pedal is released the spring 27 will return the brake to its normal or inactive position.

It might be further stated that a neon safety light, such as indicated at 32 is preferably supported at the front of the vehicle for indicating the presence of the vehicle to approaching vehicles.

What is claimed is:

A snow vehicle of the class described, comprising a main frame, a front fork mounted for pivotal movement with respect to the main frame, said front fork including a horizontal bar, a brake arm pivotally mounted on the horizontal bar, and adapted to extend rearwardly therefrom, a friction wheel mounted on the free end of the brake arm, a brake pivotally mounted above the brake arm, and adapted to move into engagement with the brake arm, forcing the brake arm downwardly, whereby said brake wheel is moved into engagement with the surface over which the vehicle is moving, braking the movement of the vehicle, a rear fork forming a part of the frame, and runners pivotally connected with the front and rear forks.

NEWTON F. FONER.

REFERENCES CITED

The following references are of record in the file of this patent:

UNITED STATES PATENTS

| Number | Name | Date |
|---|---|---|
| 1,127,307 | Staub | Feb. 2, 1915 |
| 1,429,636 | Rowe | Sept. 19, 1922 |
| 1,551,384 | Goldschmidt | Aug. 25, 1925 |